United States Patent Office 2,732,280
Patented Jan. 24, 1956

2,732,280
DISPROPORTIONATION OF CHLOROSILANES EMPLOYING CYANAMIDE CATALYSTS

Donald L. Bailey, Snyder, and George H. Wagner, Clarence, N. Y., assignors to Union Carbide and Carbon Corporation, a corporation of New York No Drawing. Application March 25, 1953,
Serial No. 344,681

19 Claims. (Cl. 23—14)

This invention relates to those compounds normally termed chlorosilanes and, more particularly, to the production of such compounds by a new and improved process.

The widely known methods for the production of chlorosilanes yield, in general, a trichlorosilane as the principal product. In such methods, however, there is also obtained minor proportions of other compounds, including monochloro- and dichlorosilanes. The latter compounds have been found particularly useful in numerous syntheses and, therefore, considerable attention has been directed toward their production. Heretofore, efforts to obtain such compounds have been for the most part directed toward either modifying the well-known reactions which yield a trichlorosilane or by reacting a trichlorosilane with other compounds whereby one or more chlorine atoms are removed. Production of monochloro- and dichlorosilanes by either of the above methods has not proven entirely satisfactory and, consequently, the need for an improved method exists.

In its broadest aspects, the invention permits, in an assemblage of chlorosilane molecules, a redistribution of particular atoms connected to silicon. Such redistribution may be termed a disproportionation of the molecule whereby a rearrangement of the atoms is accomplished. It has been found that the method of our invention affects disproportionation of only those chlorosilane molecules containing at least one hydrogen to silicon bond. In each instance where disproportionation occurs, the redistribution affects only those hydrogen and chlorine atoms which are bonded to a silicon atom. For example, trichlorosilane, HSiCl₃, may be disproportionated whereby a rearrangement of hydrogen and chlorine atoms occurs to yield dichlorosilane, H₂SiCl₂, and silicon tetrachloride, SiCl₄. Dichlorosilane, H₂SiCl₂, may also be disproportionated and yields monochlorosilane, H₃SiCl, and trichlorosilane, HSiCl₃. In a like manner under the teachings of our invention, the substituted chlorosilanes may be disproportionated so long as such molecules contain at least one hydrogen atom bonded to silicon. For example, an alkyldichlorosilane disproportionates to the alkyltrichlorosilane and the alkylmonochlorosilane. The redistribution of atoms which occurs when disproportionating a substituted chlorosilane is limited solely to a rearrangement of those hydrogen and chlorine atoms bonded to silicon. The substituent group or groups bonded to the silicon atom of a chlorosilane are not affected by the process of our invention.

Disproportionation is effected in accordance with the present invention by treating the chlorosilanes with a catalyst at temperatures preferably below 150° C. and generally between 30° and 80° C. The catalysts employed may be taken from a class of compounds comprising the aliphatic cyanamides. If temperatures above 150° C. are employed, difficulty occasionally arises, as it has been found that oftentimes the catalysts decompose and lose their catalytic activity. In the practice of our invention the amount of catalyst employed is not critical and, therefore, from about 1% to about 50% by weight of a chlorosilane may be used. The preferred range, however, varies from about 5% to about 10% by weight of the chlorosilane.

The redistribution effected by the disproportionation of chlorosilanes conducted in accordance with the present invention may be represented by the following equation:

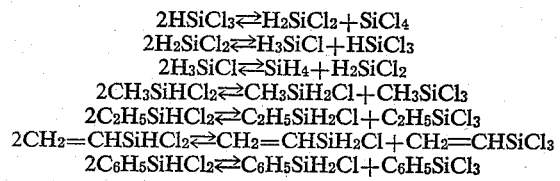

wherein R may be alkyl, aryl, chlorine or hydrogen.

Representative examples of the effected rearrangement are depicted by the following equations wherein trichlorosilane, dichlorosilane, methyldichlorosilane, ethyldichlorosilane, vinyldichlorosilane, and phenyldichlorosilane are disproportionated:

$$2HSiCl_3 \rightleftharpoons H_2SiCl_2 + SiCl_4$$
$$2H_2SiCl_2 \rightleftharpoons H_3SiCl + HSiCl_3$$
$$2H_3SiCl \rightleftharpoons SiH_4 + H_2SiCl_2$$
$$2CH_3SiHCl_2 \rightleftharpoons CH_3SiH_2Cl + CH_3SiCl_3$$
$$2C_2H_5SiHCl_2 \rightleftharpoons C_2H_5SiH_2Cl + C_2H_5SiCl_3$$
$$2CH_2=CHSiHCl_2 \rightleftharpoons CH_2=CHSiH_2Cl + CH_2=CHSiCl_3$$
$$2C_6H_5SiHCl_2 \rightleftharpoons C_6H_5SiH_2Cl + C_6H_5SiCl_3$$

Thus, the general effect of the disproportionation of a given chlorosilane is to form two different chlorosilanes, one of which contains more chlorine atoms and fewer hydrogen atoms bonded to silicon than the starting material, and the other of which contains fewer chlorine atoms and more hydrogen atoms bonded to silicon than the starting chlorosilane.

The process of our invention may be conducted by any suitable method, preferably while maintaining the temperature below 150° C. For example, the chlorosilane and catalyst may be placed in an autoclave and heated or vapors of the chlorosilane may be passed over a bed of the catalyst. It is also possible to conduct the reaction at atmospheric pressures whenever the boiling point of the starting chlorosilane is below the temperature employed in disproportionation.

As is evident in the above equations, the disproportionation reactions are in chemical equilibria and, therefore, the products of such reactions are present in the reaction mixture in amounts determined by the equilibrium constants for the reactions. We have found it possible to obtain yields in excess of the equilibrium amounts by employing a method which permits the removal from the reaction mixture of one of the products as it is prepared. By so doing, the reaction will proceed toward completion.

The preferred method for carrying out the process of our invention makes use of the fact that the chlorosilanes are disproportionated at temperatures below their boiling points. Therefore, by conducting the reaction in a flask connected to a fractionating column and heating to the boiling temperature of the mixture under conditions of partial reflux, the lower boiling chlorosilane prepared by the disproportionation will distill, thus causing the reaction to proceed toward completion with increased yields.

Care should be taken when employing the preferred method of our invention to determine whether the boiling temperatures at atmospheric pressure are in excess of 150° C. If they should be greater than or in the vicinity of 150° C., as is the case when some of the aryl chlorosilanes are employed, it is desirable that the reaction be conducted under reduced pressures, thereby permitting lower disproportionating and boiling temperatures.

Of course, it may not always be convenient to effect disproportionation of chlorosilanes by the preferred method. For example, whenever the chlorosilane is gaseous at room temperature and at atmospheric pressure, it will be desirable to employ an autoclave or to pass the gas over a bed of the catalyst.

Aliphatic cyanamides found particularly useful as catalysts in the present invention are the dialkyl and dialkenyl cyanamides, for example, the dimethyl, diethyl, diisopropyl and diallyl cyanamides. Such cyanamides within the scope of this invention may, if desired, be activated by heating, preferably at reflux temperatures and atmospheric pressure, with chlorosilanes. In such instances, the cyanamide and a chlorosilane are refluxed for a period and the low-boiling products resulting therefrom are distilled off. The product remaining comprises a high-boiling mixture of the cyanamide and chlorosilane, which may be termed an activated cyanamide. Aliphatic cyanamides activated in this manner have been found to be highly catalytic in the disproportionation of chlorosilanes.

Disproportionation of chlorosilanes may be conducted in accordance with the instant invention by placing the chlorosilane and a catalyst, for example dimethyl cyanamide, in a flask connected to a fractionating column and heating at reflux temperatures under atmospheric conditions. In the disproportionation of chlorosilanes which yield gaseous products distilling below room temperature, as trichlorosilane, a special type of fractionating column was employed. This column was equipped with a Dry Ice cold finger and a vacuum jacket. The products obtained by refluxing were identified by further distillation, infra-red measurements, determination of densities, refractive indices, molecular weights (gas density methods), and analysis for hydrolyzable hydrogen and chlorine.

Following this method, several disproportionation reactions of trichlorosilane were conducted at atmospheric pressure employing dimethyl cyanamide as the catalysts. The results appear in the table below:

TABLE I

Disproportionation of trichlorosilane

| $HSiCl_3$ charged (grams) | Catalyst | Time of refluxing (hours) | $H_2SiCl_2$ obtained (grams) |
|---|---|---|---|
| 113 | 45 g. Dimethyl cyanamide | 5.75 | 14.3 |
| 221.5 | 98 g. Dimethyl cyanamide | 5 | 36 |
| 225 | 99 g. Dimethyl cyanamide | 5.3 | 25 |

Alkyldichlorosilanes may also be disproportionated with dimethyl cyanamide. The method for carrying out such disproportionation is broadly identical to that outlined for trichlorosilane. However, as alkyldichlorosilanes yield only liquid products, there is no need for employing the cold finger and vacuum jacket. Analysis of the products obtained was conducted by the various methods referred to above.

The following tables disclose the reactants, amounts thereof, and the conditions of the disproportionation of a representative alkylchlorosilane, ethyldichlorosilane, when conducted in a fractionating column at atmospheric pressure and at reflux temperatures. Also noted is the product obtained and the yield of said product.

TABLE II

Disproportionation of ethyldichlorosilane

| $C_2H_5SiHCl_2$ charged (grams) | Catalyst | Time of refluxing (hours) | $C_2H_5SiH_2Cl$ obtained (grams) |
|---|---|---|---|
| 92.3 | 8.25 g. Dimethyl cyanamide | 4 | 14.8 |
| 100 | 10 g. Dimethyl cyanamide | 5 | 20.8 |
| 841 | 42 g. Dimethyl cyanamide | 12.5 | 135.3 |
| 874 | 44 g. Dimethyl cyanamide | 10 | 160.3 |

Those chlorosilanes containing at least one hydrogen atom connected to the silicon atom may be disproportionated by other aliphatic cyanamides, for example, diethyl cyanamide, diisopropyl cyanamide and diallyl cyanamide may be employed. There is no appreciable difference in the mechanism of such reactions as to whether the aliphatic group attached to the cyanamide group is saturated or unsaturated. The method of employing these cyanamides as well as their homologs in disproportionation reactions is identical with that described when employing dimethyl cyanamide, namely, placing the chlorosilane and the catalyst in a flask connected to a fractionating column, refluxing and collecting the distillate.

The following table discloses the results of disproportionating a chlorosilane at atmospheric pressure and at reflux temperatures when employing a catalyst other than dimethyl cyanamide.

TABLE III

Disproportionation of chlorosilanes

| Chlorosilane Disproportionated | Catalyst | Product Obtained |
|---|---|---|
| 85 g. $C_2H_5SiCl_2$, Ethyl Dichlorosilane. | 10 g. Diethyl Cyanamide. | 18 g. $C_2H_5SiH_2Cl$, Ethyl Monochlorosilane. |
| 74 g. $C_2H_5SiCl_2$, Ethyl Dichlorosilane. | 5 g. Diallyl Cyanamide. | .5 g. $C_2H_5SiH_2Cl$, Ethyl Monochlorosilane. |
| 81.5 g. $C_2H_5SiCl_2$, Ethyl Dichlorosilane. | 10 g. Diisopropyl Cyanamide. | .7 g. $C_2H_5SiH_2Cl$, Ethyl Monochlorosilane. |

The disproportionation catalysts of our invention may, as indicated above, be activated and thus made increasingly catalytic by refluxing with a chlorosilane. Accordingly, such activation is accomplished by placing an aliphatic cyanamide, for example, dimethyl cyanamide, and a chlorosilane, for example, ethyl dichlorosilane, in a flask connected to a fractionating column. Heat is applied and the mixture allowed to reflux. The low-boiling products are distilled and the high-boiling product remaining comprises a mixture of the cyanamide and the chlorosilane. This high-boiling product may be then employed as a disproportionating catalyst. Of course, other dialkyl cyanamides may be activated in the above manner and it has been found that any chlorosilane may be employed as the activating material; they include trichlorosilane, alkyldichlorosilanes, alkyltrichlorosilanes, and the aryltrichlorosilanes such as phenyl trichlorosilane.

Valuable and beneficial aspects of the present invention include the disproportionating of a chlorosilane with an aliphatic cyanamide, and thereafter continuing to reflux the cyanamide and the chlorosilane remaining until all of the low-boiling material is removed, thus preparing an activated catalyst. The newly prepared activated catalyst may be then employed to disproportionate the identical chlorosilane employed in its preparation or to disproportionate other chlorosilanes.

The table below discloses the results of disproportionating trichlorosilane with the aid of an activated cyanamide. In each instance the catalyst was prepared solely for the purpose of disproportionating trichlorosilane, that is, the catalyst was not the remaining product or residue of a previously conducted disproportionation. The disproportionation of trichlorosilane was conducted by refluxing with a catalyst at atmospheric pressure in a flask connected to a fractionating column, and collecting the distillate.

TABLE IV

Disproportionation of trichlorosilane employing an activated cyanamide

| $HSiCl_3$ Charged (grams) | Catalyst | Time of Refluxing (hr.) | $H_2SiCl_2$ Obtained (grams) |
|---|---|---|---|
| 104.5 | 7 g. High-boiling product remaining after refluxing 9 weight-percent dimethyl cyanamide with ethyl trichlorosilane. | 7.5 | 28.2 |
| 106 | 11.2 g. High-boiling product remaining after refluxing 10 weight-percent diethyl cyanamide with ethyl trichlorosilane. | 5 | 19.2 |
| 111 | 12 g. High-boiling product remaining after refluxing 12 weight-percent dimethyl cyanamide with phenyl trichlorosilane. | 6.25 | 30.1 |

As previously indicated, activated catalysts may be prepared from the remaining material or still residue of a disproportionation. That is, after the desired products have been obtained, refluxing is continued until all low-boiling compounds have been distilled, and the high-boiling product remaining comprises the activated catalyst. For example, 113 grams trichlorosilane was disproportionated by employing 45 grams dimethyl cyanamide as the catalyst and refluxing, and there was obtained 14.3 grams of dichlorosilane (Table I). After the maximum amount of dichlorosilane was obtained, refluxing was continued until all of the remaining low-boiling compounds were removed. The high-boiling product remaining, which consisted of a mixture of dimethyl cyanamide and trichlorosilane, was allowed to cool. Three (3) grams of this product was then placed in a flask containing one hundred and five (105) grams of trichlorosilane, and the flask connected to a fractionating column. Heat was applied and the mixture allowed to reflux, twenty-eight and nine-tenths (28.9) grams of dichlorosilane was obtained, indicating that the yield with the activated catalyst was approximately doubled.

In another instance, an activated catalyst was prepared from the material remaining after a disproportionation of ethyldichlorosilane with dimethyl cyanamide. After the ethyl monochlorosilane had been obtained and the other low-boiling compounds removed, 1.0 gram of the high-boiling remaining product, comprising a mixture of dimethyl cyanamide and ethyldichlorosilane, was employed to disproportionate trichlorosilane. The following table discloses the results of disproportionations of trichlorosilane employing these high-boiling remaining products of the previous disproportionations as the catalyst.

TABLE V

*Disproportionation of trichlorosilane*

| $HSiCl_3$ Charged (grams) | Catalyst | Time of Refluxing (hr.) | $H_2SiCl_2$ Obtained (grams) |
| --- | --- | --- | --- |
| 103.5 | 3 g. High-boiling product remaining after disproportionation of trichlorosilane with dimethyl cyanamide catalyst. | 5.5 | 28.9 |
| 116.5 | 1 g. High-boiling product remaining after disproportionation of ethyl dichlorosilane with dimethyl cyanamide. | 4.5 | 16.5 |

The activated catalysts of our invention may also be employed to disproportionate the chlorosilanes substituted with a hydrocarbon radical so long as such chlorosilanes contain at least one hydrogen atom attached to the silicon atom. For example, ethyldichlorosilane disproportionates, to ethylmonochlorosilane and ethyltrichlorosilane, when treated with an activated catalyst. The activated catalysts are of particular importance, as we have found that they may be employed in successive disproportionations without appreciable loss in catalytic effect.

For example, in Table II there is reported the results of disproportionating eight hundred and forty-one (841) grams of ethyl dichlorosilane with the aid of forty-two (42) grams of dimethyl cyanamide. From this reaction one hundred thirty-five and three-tenths (133.3) grams of ethyl monochlorosilane were obtained. In this reaction, the material remaining, after the recovery of ethyl monochlorosilane, was again refluxed to drive off all of the remaining low-boiling products. When this was accomplished, the high-boiling remaining product was employed as a catalyst in four additional disproportionations of ethyldichlorosilane. It was only necessary, after each use of the activated catalyst, to drive off the low-boiling products formed. The table below contains the results of the disproportionations described and also includes the original disproportionation employing dimethyl cyanamide as the catalyst.

TABLE VI

*Successive disproportionation of ethylidichlorosilane employing an activated catalyst*

| No. | $C_2H_5SiHCl_2$ Charged (grams) | Catalyst | Time of Refluxing (Hr.) | $C_2H_5SiH_2Cl$ Obtained (grams) |
| --- | --- | --- | --- | --- |
| 1 | 841 | 42 g. Dimethyl Cyanamide. | 12.5 | 135.3 |
| 2 | 800 | High-boiling remaining product from 1. | 3 | 86.3 |
| 3 | 800 | High-boiling remaining product from 2. | 6.5 | 159.5 |
| 4 | 779.5 | High-boiling remaining product from 3. | 7.5 | 142.5 |
| 5 | 765 | High-boiling remaining product from 4. | 7.5 | 97.5 |

Also acceptable for use as activated catalysts in the disproportionation of alkylchlorosilanes are those products which comprise the high-boiling material remaining from refluxing such cyanamides as diethyl cyanamide, diisopropyl cyanamide and diallyl cyanamide with any chlorosilane.

The above examples disclose the disproportionation of the various chlorosilanes, and it is to be understood that the present invention is not limited to the specific examples disclosed, but instead that it is applicable to the disproportionation of all aliphatic and aromatic chlorosilanes so long as there is at least one hydrogen atom connected to the silicon atom. Furthermore, it is to be understood that all the aliphatic cyanamides as well as those aliphatic cyanamides which are activated by refluxing with a chlorosilane may be employed as disproportionation catalysts, the examples disclosed serving only as representative compounds.

We claim:

1. A process of disproportionating a chlorosilane containing at least one hydrogen atom bonded to silicon which comprises treating said silane with an aliphatic hydrocarbyl cyanamide catalyst and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

2. A process of disproportionating a chlorosilane containing at least one hydrogen atom bonded to silicon which comprises treating said silane with a dialkyl cyanamide catalyst and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

3. A process of disproportionating a hydrocarbyl substituted chlorosilane containing at least one hydrogen atom bonded to silicon which comprises treating said silane with an aliphatic hydrocarbyl cyanamide catalyst and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

4. A process of disproportionating an alkylchlorosilane containing at least one hydrogen atom bonded to silicon which comprises treating said silane with an aliphatic hydrocarbyl cyanamide catalyst and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

5. A process of disproportionating an arylchlorosilane containing at least one hydrogen atom bonded to silicon which comprises treating said silane with a aliphatic hydrocarbyl cyanamide catalyst and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

6. A process of disproportionating a chlorosilane containing at least one hydrogen atom bonded to silicon which comprises treating said silane with a catalyst consisting of the high-boiling product obtained by heating an aliphatic hydrocarbyl cyanamide with a hydrocarbyl substituted chlorosilane and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

7. A process of disproportionating an alkylchlorosilane containing at least one hydrogen atom bonded to silicon which comprises treating said silane with a catalyst consisting of the high-boiling product obtained by heating an aliphatic hydrocarbyl cyanamide with an alkylchlorosilane and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

8. A process of disproportionating trichlorosilane which comprises treating said silane with dimethyl cyanamide and recovering dichlorosilane and silicon tetrachloride.

9. A process of disproportionating ethyldichlorosilane which comprises treating said silane with dimethyl cyanamide and recovering ethyltrichlorosilane and ethylmonochlorosilane.

10. A process of disproportionating a chlorosilane containing at least one hydrogen atom bonded to silicon which comprises treating said silane with diethyl cyanamide and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

11. A process of disproportionating a chlorosilane containing at least one hydrogen atom bonded to silicon which comprises treating said silane with dimethyl cyanamide and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

12. A process of disproportionating trichlorosilane which comprises treating said silane with a catalyst consisting of the high-boiling product obtained by heating dimethyl cyanamide with an alkylchlorosilane and recovering dichlorosilane and silicon tetrachloride.

13. A process of disproportionating trichlorosilane which comprises treating said silane with a catalyst consisting of the high-boiling product obtained by heating diethyl cyanamide with trichlorosilane and recovering dichlorosilane and silicon tetrachloride.

14. A process of disproportionating a chlorosilane containing at least one hydrogen atom bonded to silicon which comprises treating said silane with a diakly cyanamide catalyst at temperature below 150° C. and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

15. A process of disproportionating a chlorosilane containing at least one hydrogen atom bonded to silicon which comprises treating said silane at a temperature of about 30° C. to about 80° C. with a dialkyl cyanamide catalyst and recovering two different silane compounds, one of which contains more chlorine atoms and fewer hydrogen atoms attached to silicon than the starting chlorosilane, and the other contains more hydrogen atoms and fewer chlorine atoms attached to silicon than the starting chlorosilane.

16. A process of disproportionating a chlorosilane containing at least one hydrogen atom bonded to the silicon atom which comprises treating said silane with an aliphatic hydrocarbyl cyanamide at the boiling temperature under conditions of partial reflux and recovering two different silane compounds, one of which contains more chlorine atoms and fewer hydrogen atoms attached to silicon than the starting chlorosilane, and the other of which contains more hydrogen atoms and fewer chlorine atoms attached to silicon than the starting chlorosilane.

17. A process of disproportionating a chlorosilane containing at least one hydrogen atom bonded to silicon which comprises treating said silane with an aliphatic hydrocarbon cyanamide catalyst at a temperature below about 150° C. and recovering two different silane compounds one of which contains more chlorine atoms and fewer hydrogen atoms attached to silicon than the starting chlorosilane and the other of which contains more hydrogen atoms and fewer chlorine atoms attached to silicon than the starting chlorosilane.

18. A process of disproportionating trichlorosilane which comprises treating said silane with dimethyl cyanamide at a temperature below about 150° C. and recovering dichlorosilane and silicon tetrachloride.

19. A process of disproportionating a chlorosilane containing at least one hydrogen atom bonded to silicon which comprises treating said silane with from about 1 per cent to about 50 per cent by weight of the chlorosilane of a dialkyl cyanamide catalyst at a temperature below about 150° C. and recovering two different silane compounds one of which contains more chlorine atoms and fewer hydrogen atoms attached to silicon than the starting chlorosilane and the other of which contains more hydrogen and fewer chlorine atoms attached to silicon than the starting chlorosilane.

References Cited in the file of this patent

FOREIGN PATENTS 663,810    Great Britain _____ Dec. 27, 1951

OTHER REFERENCES

Sauer et al.: Jour. Am. Chem. Soc., vol. 70 (1948), pages 3590–3596.